(12) United States Patent
Ohkubo (10) Patent No.: US 6,369,848 B1
(45) Date of Patent: Apr. 9, 2002

(54) PICTURE DATA TRANSMISSION DEVICE AND PICTURE SIGNAL CODING METHOD THEREOF

(75) Inventor: Atsushi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/516,187

(22) Filed: Mar. 1, 2000

(30) Foreign Application Priority Data

Mar. 3, 1999 (JP) ............................................ 11-055458

(51) Int. Cl.[7] .................................................. H04N 7/14
(52) U.S. Cl. ................................. 348/14.08; 348/14.01; 348/14.13
(58) Field of Search ........................... 348/14.01, 14.02, 348/14.03, 14.04, 14.05, 14.06, 14.07, 14.08, 14.09, 14.1, 14.11, 14.12, 14.13, 14.14, 14.15; 370/260; 709/204; H04N 7/14

(56) References Cited

FOREIGN PATENT DOCUMENTS

JP          410013799 A   *   1/1998   ............ H04N/7/14

* cited by examiner

Primary Examiner—Huyen Le
Assistant Examiner—Melur Ramakrishnaiah
(74) Attorney, Agent, or Firm—Young & Thompson (57) ABSTRACT

The picture data transmission device for use in the transmission of a picture in a television system includes a picture input circuit, a region extraction processing circuit for extracting, from an input picture signal, a picture signal of a predetermined region in a picture frame of the picture in question, a picture coding circuit for coding and outputting a picture signal of a region extracted, and a network interface circuit for transmitting a coded signal to a terminal device of other conference participant, the region extraction processing circuit extracting, from a picture frame, a picture signal of a target picture region containing a target picture and a picture signal of a part of a background region which is a region other than the target picture region in question and transferring the signals to the picture coding means, as well as selecting, in each picture frame, a different part of the background region as a part of the background region to be extracted.

16 Claims, 7 Drawing Sheets

ORIGINAL PICTURE

PICTURE WITH ARBITRARY REGION EXTRACTED

PICTURE DATA TRANSMISSION DEVICE AND PICTURE SIGNAL CODING METHOD THEREOF

BACKGROUND OF THE INVENTION

1. Field of the Invention

The present invention relates to a picture data transmission device for use in transmitting a picture in a television system and, more particularly, to a picture data transmission device for use as a transmission terminal device in a television conference system and a picture signal coding method thereof.

2. Description of the Related Art

Figure 6:
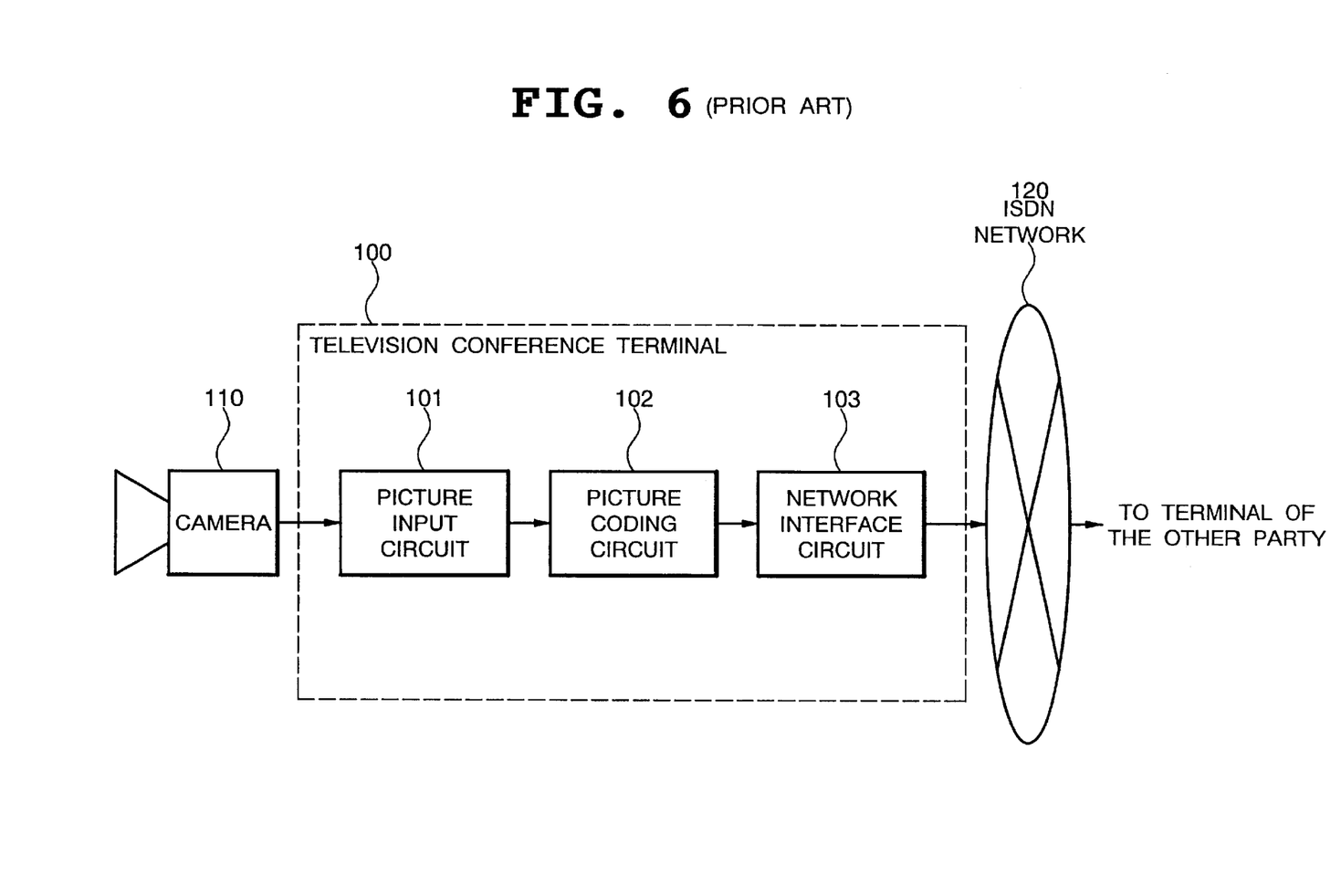
FIG. 6 is a block diagram showing a structure of a conventional picture data transmission device.

In a television conference system in which a conference is held using a two-way television system, a conventional picture data transmission device for transmitting picture data codes the entire image obtained by a camera and transmits the coded image to a terminal device of other conference participant. FIG. 6 shows an example of a structure of a conventional picture data transmission device.

With reference to FIG. 6, a conventional picture data transmission device 100 includes a picture input circuit 101 for receiving input of a picture signal, a picture coding circuit 102 for coding a picture applied through the picture input circuit 101 and a network interface circuit 103 for transmitting a coded signal obtained by the picture coding circuit 102 to a terminal device of other conference participant through an ISDN network 120.

A picture signal obtained by a camera 110 is applied to the picture data transmission device 100 through the picture input circuit 101 and subjected to compression and coding processing conducted by the picture coding circuit 102. Then, the generated coded data is output from the network interface circuit 103 and transmitted to other terminal device through the ISDN network 120.

At the coding of a picture signal, thus structured picture data transmission device conventionally codes the entire image on an image basis. In the transmission of a signal over an ISDN network, however, because a transmission speed is not high enough, coding of a picture signal of a picture with rapid motions requires frame-dropping to be executed and a quantization unit to be increased in order to suppress an increase in the amount of coded data generated.

However, in a case where a picture as a background of an object to be filmed (hereinafter, referred to as a background picture) is a picture which is steadily moving and whose motion is more rapid than that of a picture of the object to be filmed itself (hereinafter, referred to as a target picture), frame-cutdown and rough quantization will make the target picture unclear.

Figure 7:
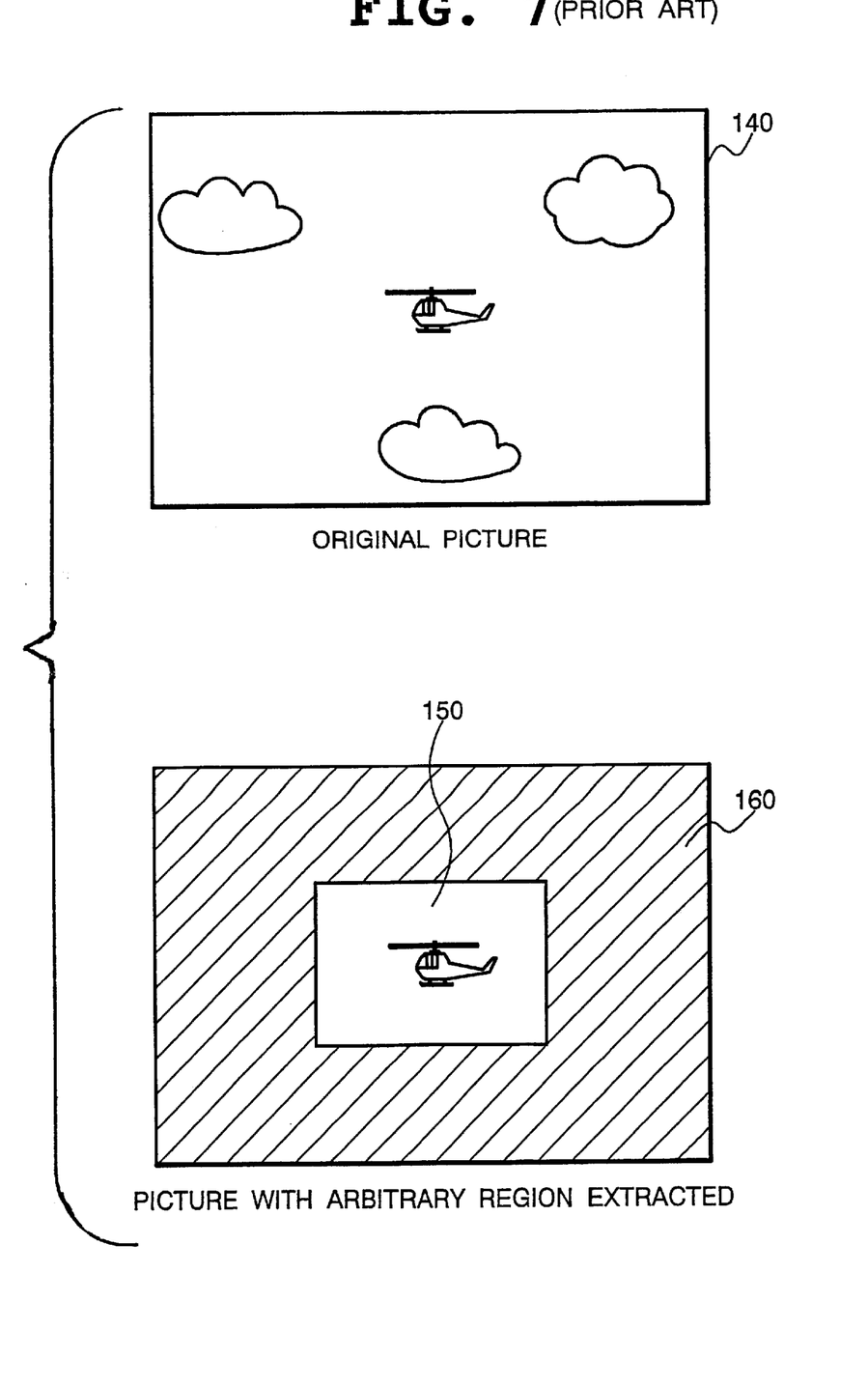
FIG. 7 is a diagram showing an example of a manner of limiting a picture in a conventional picture signal coding method.

Another method of reducing the amount of coded data generated is extracting a predetermined region 150 out of an original picture frame 140 prior to coding processing to make the other region 160 unicolor (e.g. all in black), thereby drastically reducing coded data of the other region 160 in question as illustrated in FIG. 7. This method, however, results in making the other region 160 in question unicolor only to make the contents of the picture of the other region 160 completely unknown.

As described above, conventional picture data transmission devices code the entire image at the time of coding a picture signal. Then, with respect to a picture with rapid motions, frame-dropping and rough quantization are conducted to suppress an increase in the amount of coded data generated, whereby also when a background picture is more rapid in motion than a target picture, the target picture becomes unclear.

Also when the amount of coded data generated is reduced by extracting a predetermined region out of a picture frame and making the remaining region unicolor, a picture of other region than the predetermined region in question can not be transmitted.

SUMMARY OF THE INVENTION

An object of the present invention is to provide a picture data transmission device which solves the above-described conventional shortcomings and is capable of transmitting a clear picture with the amount of coded data generated suppressed without having frame-dropping and an increase in a quantization unit and without limiting a region subjected to coding processing, and a picture signal coding method thereof.

According to the first aspect of the invention, a picture data transmission device for use in the transmission of a picture in a television system, comprises picture input means for receiving input of a picture signal, region extraction processing means for extracting, from a picture signal applied through the picture input means, a picture signal of a predetermined region in a picture frame of the picture in question, picture coding means for coding and outputting a picture signal of a region extracted by the region extraction processing means, and interface means for transmitting a coded signal obtained by coding by the picture coding means to a terminal device of other conference participant by means of predetermined transmission means, wherein the region extraction processing means out of a picture frame, extracts a picture signal of a target picture region containing a target picture and a picture signal of a part of a background region which is other region than the target picture region in question and transfers the signals to the picture coding means, and selects a part of the background region to be extracted from the picture signal such that the part varies with each picture frame.

In the preferred construction, with respect to each picture frame, the region extraction processing means sequentially selects an arbitrary number of divisional background regions which are obtained by dividing the background region into a plurality of small regions to extract a picture signal.

In another preferred construction, the picture coding means outputs a coded signal obtained by coding a picture signal extracted by the region extraction processing means, as well as continuously outputting a coded signal output immediately before with respect to a region in the picture frame not included in the picture signal extracted by the region extraction processing means.

In another preferred construction, with respect to each picture frame, the region extraction processing means sequentially selects an arbitrary number of divisional background regions which are obtained by dividing the background region into a plurality of small regions to extract a picture signal, and the picture coding means outputs a coded signal obtained by coding a picture signal extracted by the region extraction processing means, as well as continuously outputting a coded signal output immediately before with respect to a region in the picture frame not included in the picture signal extracted by the region extraction processing means.

According to the second aspect of the invention, a picture signal coding method in a television system, comprising the steps of from an applied picture signal, extracting a picture signal of a predetermined region in a picture frame of the picture in question, and coding and outputting a picture signal of a region extracted by the region extraction step, wherein at the region extraction step out of a picture frame, a picture signal of a target picture region containing a target picture and a picture signal of a part of a background region which is other region than the target picture region in question are extracted and transferred to the picture coding means, and a part of the background region to be extracted from the picture signal is selected such that the part varies with each picture frame.

In the preferred construction, at the region extraction step, with respect to each picture frame, an arbitrary number of divisional background regions which are obtained by dividing the background region into a plurality of small regions are sequentially selected to extract a picture signal.

In another preferred construction, at the coded signal outputting step, a coded signal obtained by coding a picture signal extracted at the region extraction step is output, while a coded signal output immediately before is continuously output with respect to a region in the picture frame not included in the picture signal extracted at the region extraction step.

In another preferred construction, at the region extraction step, an arbitrary number of divisional background regions which are obtained by dividing the background region into a plurality of small regions are sequentially selected with respect to each picture frame to extract a picture signal, and at the coded signal outputting step, a coded signal obtained by coding a picture signal extracted at the region extraction step is output, while a coded signal output immediately before is continuously output with respect to a region in the picture frame not included in the picture signal extracted at the region extraction step.

According to the third aspect of the invention, a computer readable memory storing a picture signal coding program for controlling a picture data transmission device for use in the transmission of a picture in a television system to code a picture signal, the picture signal coding program comprising the steps of from an applied picture signal, extracting a picture signal of a predetermined region in a picture frame of the picture in question, and coding and outputting a picture signal of a region extracted at the region extraction step, wherein at the region extraction step out of a picture frame, a picture signal of a target picture region containing a target picture and a picture signal of a part of a background region which is other region than the target picture region in question are extracted and transferred to the picture coding means, and a part of the background region to be extracted from the picture signal is selected such that the part varies with each picture frame.

In the preferred construction, the picture signal coding program, at the region extraction step, sequentially selects, with respect to each picture frame, an arbitrary number of divisional background regions which are obtained by dividing the background region into a plurality of small regions to extract a picture signal.

In another preferred construction, the picture signal coding program, at the coded signal outputting step, outputs a coded signal obtained by coding a picture signal extracted at the region extraction step, as well as continuously outputting a coded signal output immediately before with respect to a region in the picture frame not included in the picture signal extracted at the region extraction step.

In another preferred construction, the picture signal coding program, at the region extraction step, with respect to each picture frame, sequentially selects an arbitrary number of divisional background regions which are obtained by dividing the background region into a plurality of small regions to extract a picture signal, and at the coded signal outputting step, outputs a coded signal obtained by coding a picture signal extracted at the region extraction step, as well as continuously outputting a coded signal output immediately before with respect to a region in the picture frame not included in the picture signal extracted at the region extraction step.

According to another aspect of the invention, a picture data transmission device for use in the transmission of a picture in a television system, comprises a picture input circuit which receives input of a picture signal, a region extraction processing circuit which extracts, from a picture signal applied through the picture input circuit, a picture signal of a predetermined region in a picture frame of the picture in question, a picture coding circuit which codes and outputs a picture signal of a region extracted by the region extraction processing circuit, and an interface circuit which transmits a coded signal obtained by coding by the picture coding circuit to a terminal device of other conference participant by means of a predetermined transmission circuit, wherein the region extraction processing circuit out of a picture frame, extracts a picture signal of a target picture region containing a target picture and a picture signal of a part of a background region which is other region than the target picture region in question and transfers the signals to the picture coding circuit, and selects a part of the background region to be extracted from the picture signal such that the part varies with each picture frame.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
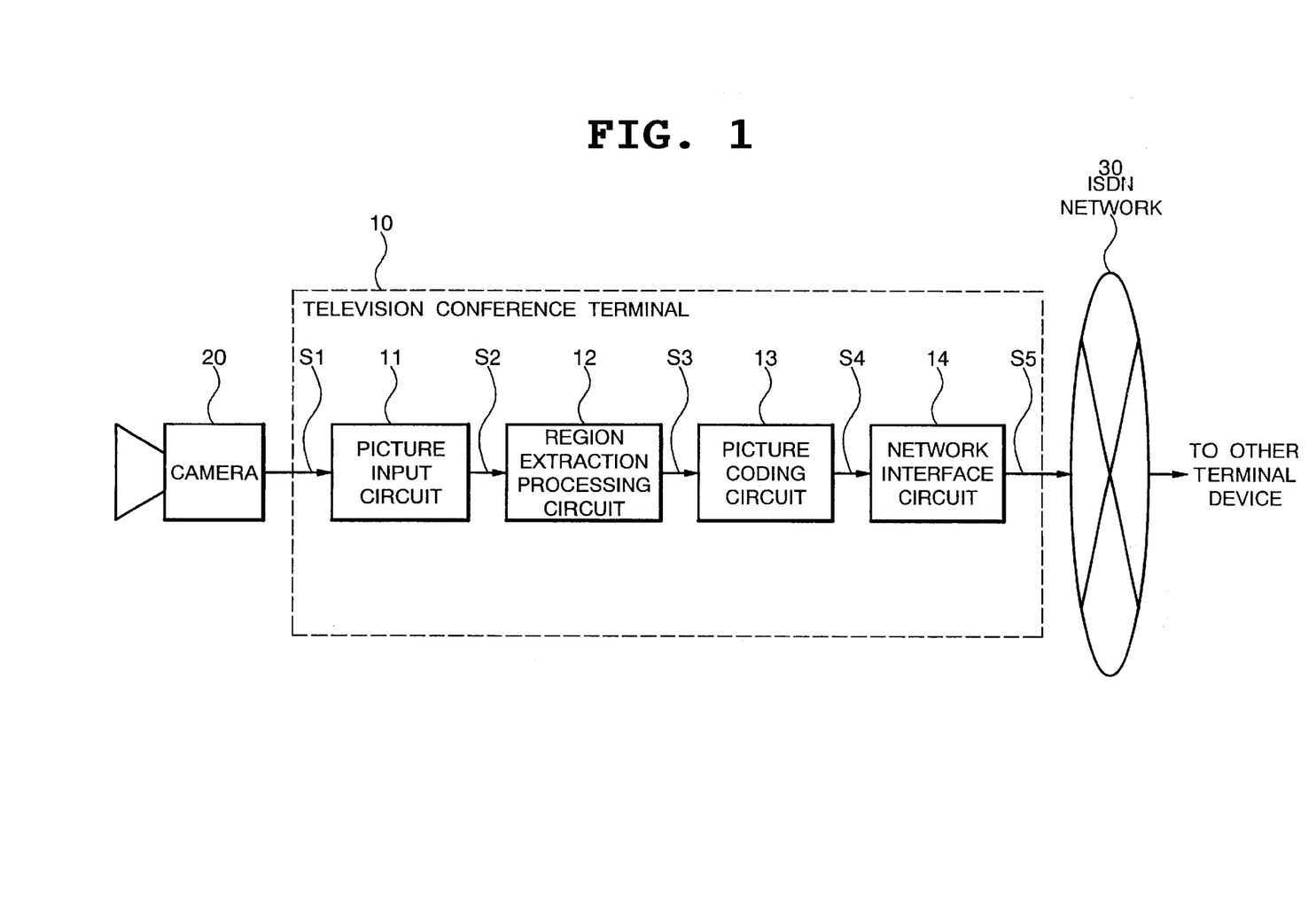
FIG. 1 is a block diagram showing a structure of a picture data transmission device according to one embodiment of the present invention.

FIG. 1 is a block diagram showing a structure of a picture data transmission device according to one embodiment of the present invention. A picture data transmission device 10 is used at a terminal device for use in a television conference system to transmit a picture to a terminal device of other conference participant.

With reference to FIG. 1, the picture data transmission device 10 of the present embodiment includes a picture input circuit 11 for receiving input of a picture signal, a region extraction processing circuit 12 for extracting a predetermined region from a picture applied through the picture input circuit 11, a picture coding circuit 13 for coding a picture signal of a region extracted by the region extraction processing circuit 12, and a network interface circuit 14 for transmitting a coded signal obtained by the picture coding circuit 13 to a terminal device of other conference participant over an ISDN network.

As shown in the figure, the picture data transmission device 10 is connected to a camera 20, as well as to other terminal device through an ISDN network 30. In FIG. 1, illustration is made only of a characteristic part of the structure of the present embodiment.

In the above-described structure, the picture input circuit 11, which is implemented by an interface adapted to a picture signal output from the camera 20, accepts a picture signal Si obtained by the camera 20 and transfers the signal to the region extraction processing circuit 12 as a picture signal S2.

The region extraction processing circuit 12, which is implemented by, for example, program-controlled CPU and RAM or other internal memory, extracts a predetermined region from a signal of a picture filmed by the camera 20 and transfers a picture signal S3 of the region in question to the picture coding circuit 13. Details of the region extraction processing by the region extraction processing circuit 12 will be described later.

The picture coding circuit 13, which is implemented by, for example, program-controlled CPU and RAM or other internal memory, codes the picture signal S3 of a region extracted by the region extraction processing circuit 12 and transfers the coded signal generated to the network interface circuit 14.

The network interface circuit 14, which is an interface adapted to a protocol of the ISDN, transmits a picture signal (coded signal) S4 coded by the picture coding circuit 13 to a terminal device of other conference participant through the ISDN network 30 (S5).

Next, description will be made of details of region extraction processing by the region extraction processing circuit 12 in the present embodiment. In the following description, on a picture frame, a region of an arbitrary size in a target picture is referred to as a target picture region and other region than the target picture region is referred to as a background region. Example of a target picture region and a background region is shown in FIG. 2.

Figure 2:
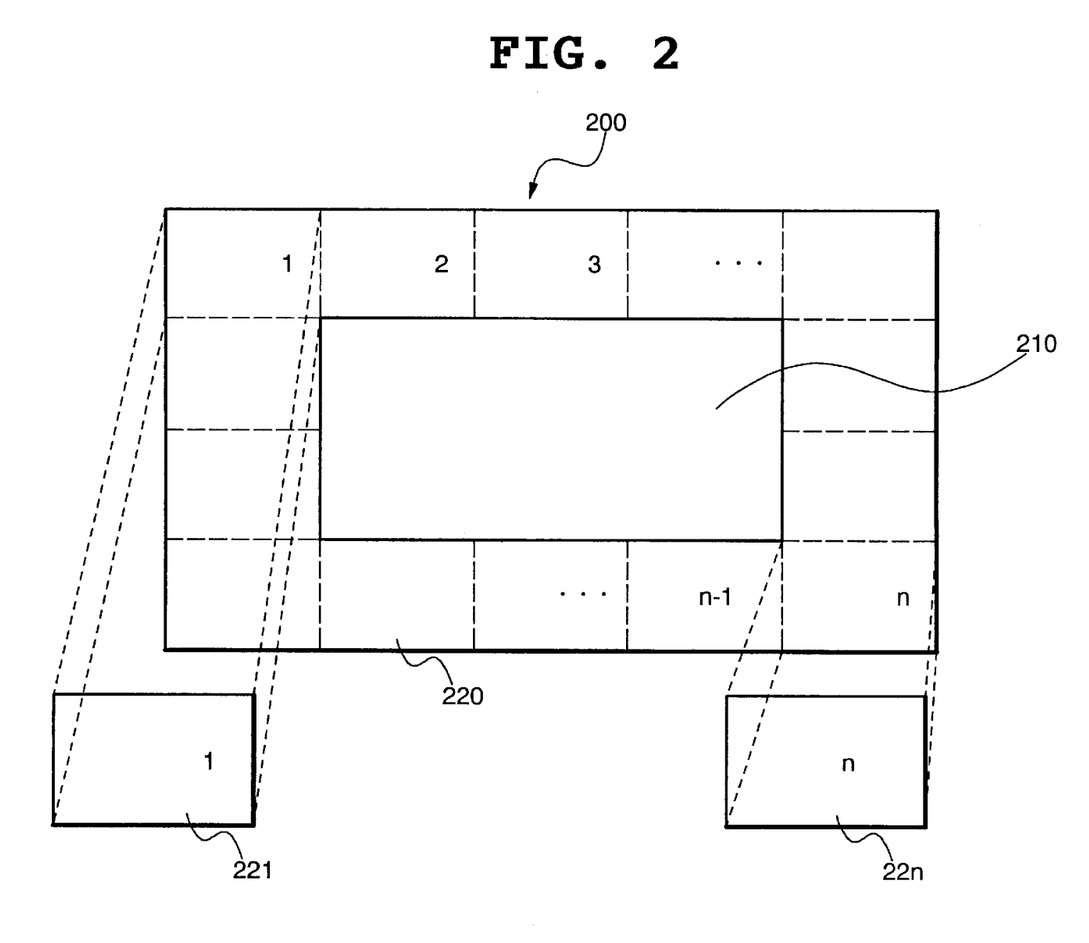
FIG. 2 is a diagram showing an example of a pattern of a region from which a picture signal is extracted out of a picture frame.

With reference to FIG. 2, a picture frame 200 is roughly divided into a target picture region 210 around the center and a background region 220 surrounding the target picture region 210. The background region 220 is further divided into a number n of divisional background regions 221–22n.

Upon receiving input of a picture signal from the picture input circuit 11, the region extraction processing circuit 12 recognizes the target picture region 210 and the divisional background regions 221–22n in each picture frame 200. Then, the circuit 12 extracts a picture signal corresponding to the target picture region 210, as well as extracting a picture signal corresponding to a predetermined one of the divisional background regions 221–22n selected according to a predetermined rule.

Figure 3:
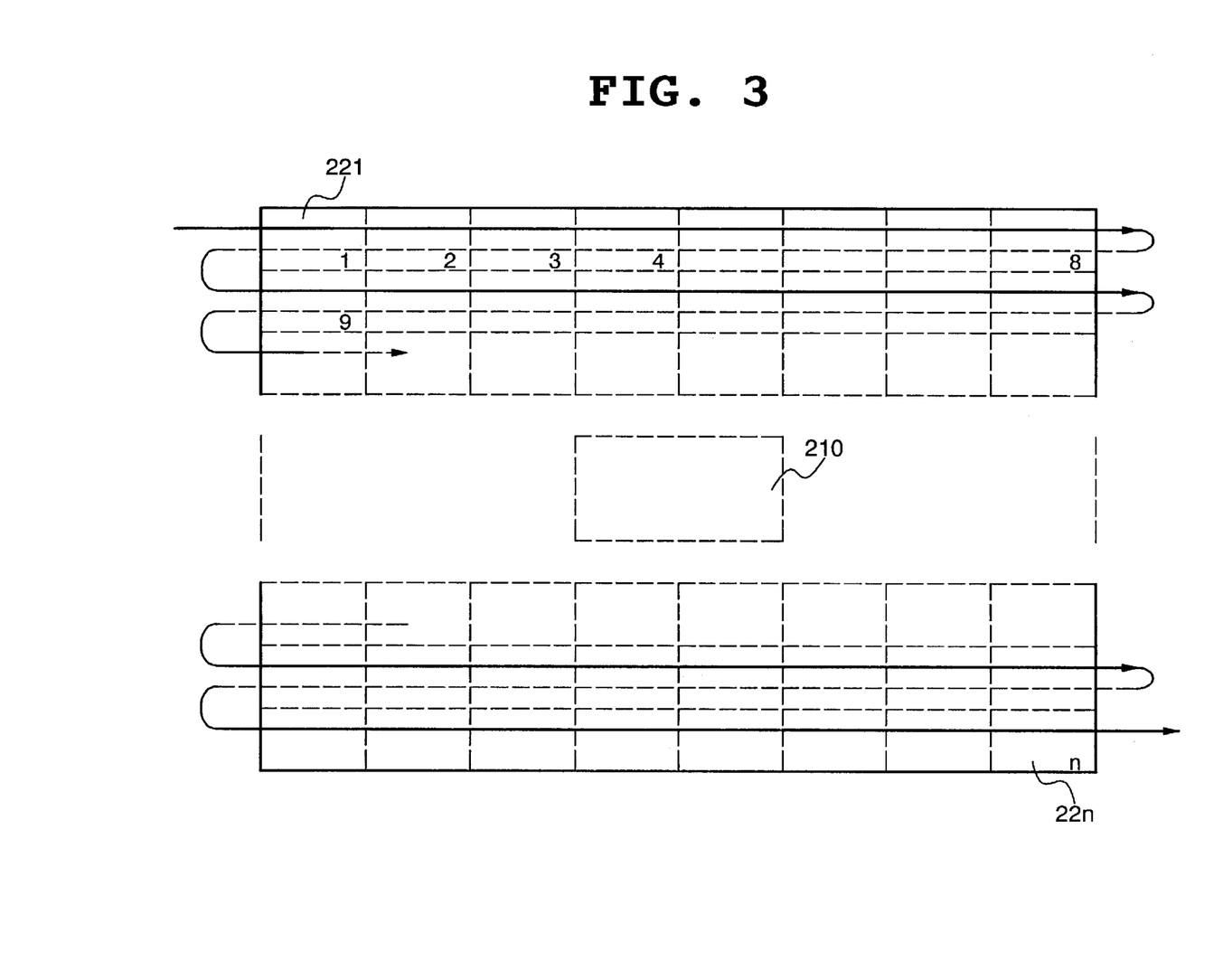
FIG. 3 is a diagram showing one example of a method of selecting a background region to be extracted from the picture frame.

Possible method of selecting divisional background regions 221–22n to be extracted is, for example, selecting one of the divisional background regions 221–22n from left to right in each horizontal row as shown in FIG. 3. In this case, picture signals extracted from one picture frame 200 are a picture signal corresponding to the target picture region 210 and a picture signal corresponding to one of the divisional background regions 221–22n. The divisional background regions 221–22n to be extracted shift, as shown in FIG. 3, from left to right and from the uppermost row downward every time the picture frame 200 is updated.

Figure 4:
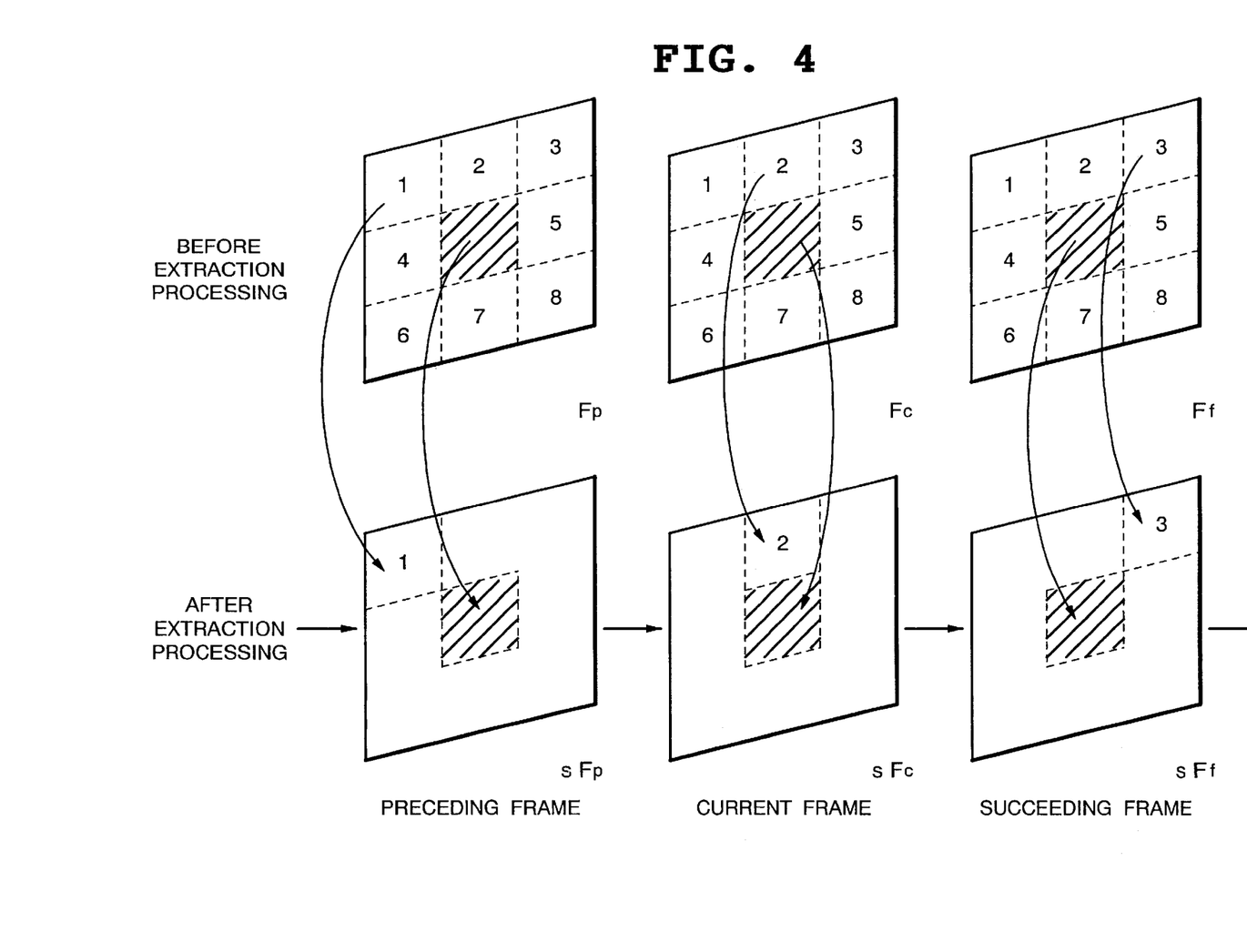
FIG. 4 is a diagram for use in explaining extraction operation by a region extraction processing circuit.

With reference to FIG. 4, more specific description will be made. In the example of FIG. 4, a picture frame is divided into a total of nine regions made up of three in the vertical direction by three in the horizontal direction. Here, description will be made assuming that a region at the center with slanting lines is a target picture region and eight regions surrounding the target picture region are divisional background regions. The target picture region is not necessarily situated at the center. The region extraction processing circuit 12 is assumed to extract a divisional background region one by one from each picture frame in the order of numbers (1 to 8) allotted to the respective divisional background regions in FIG. 4.

In FIG. 4, the current picture frame (current frame) is referred to as Fc. The picture frame Fc turns into a picture signal indicated as a picture frame sFc as a result of the extraction of a target picture region and a divisional background region with the number "2" allotted in FIG. 4 by the region extraction processing circuit 12. Also as illustrated in the figure, a picture frame Fp preceding the current frame Fc turns into a picture signal indicated as a picture frame sFp as a result of the extraction of the target picture region and a divisional background region with the number "1" allotted in FIG. 4. Similarly, a picture frame Ff succeeding the current frame Fc turns into a picture signal indicated as a picture frame sFf as a result of the extraction of the target picture region and a divisional background region with the number "3" allotted in FIG. 4.

In a manner as described above, picture signals of the extracted picture frames (in the example of FIG. 4, picture frames sFp, sFc and sFf) are sent from the region extraction processing circuit 12 to the picture coding circuit 13. The picture coding circuit 13 codes and outputs the picture signal of the picture frame from which the regions have been extracted and which is received from the region extraction processing circuit 12. On this occasion, as to a region not included in the picture signal received from the region extraction processing circuit 12, a picture signal output immediately before will be continuously output.

More specifically, in the three frames shown in FIG. 4, a picture signal of a target picture region is updated (refreshed) in each frame and a picture signal of a background region is updated (refreshed) in each frame on the basis of one region of the divisional background regions from left in the uppermost row to right in order.

Accordingly, when the picture signal of the picture frame sFc is coded, as to the divisional background region with the number "1" allotted in FIG. 4, a coded signal of the picture signal which has been updated (refreshed) at the time of coding of the picture signal of the picture frame sFp will be continuously output.

When the picture signal of the picture frame sFf is coded, as to the divisional background region with the number "1" allotted in FIG. 4, a coded signal of the picture signal which has been updated (refreshed) at the time of coding of the picture signal of the picture frame sFp, and as to the divisional background region with the number "2" allotted, a coded signal of the picture signal which has been updated (refreshed) at the time of coding of the picture signal of the picture frame sFc will be continuously output.

Also as to the remaining divisional background regions, in a case where at the coding of a picture signal of an immediately preceding picture frame, a coded signal has been output, the coded signal in question will be continuously output.

Next, description will be made of a flow of picture data transmission processing according to the present embodiment. In FIG. 1, the picture signal Si obtained by the camera 20 is applied to the picture data transmission device 10 by means of the picture input circuit 11 and has a target picture region and a part of a background region extracted by the region extraction processing circuit 12.

Then, the picture signal S3 extracted by the region extraction processing circuit 12 is subjected to compression and coding processing by the picture coding circuit 13. Then, the generated coded signal S4 is output from the network interface 14 and transmitted to other terminal device through the ISDN network 30.

As a result, picture data with a picture of a target picture region and a picture of a part of a background region refreshed in each frame is transmitted to other terminal device.

Figure 5:
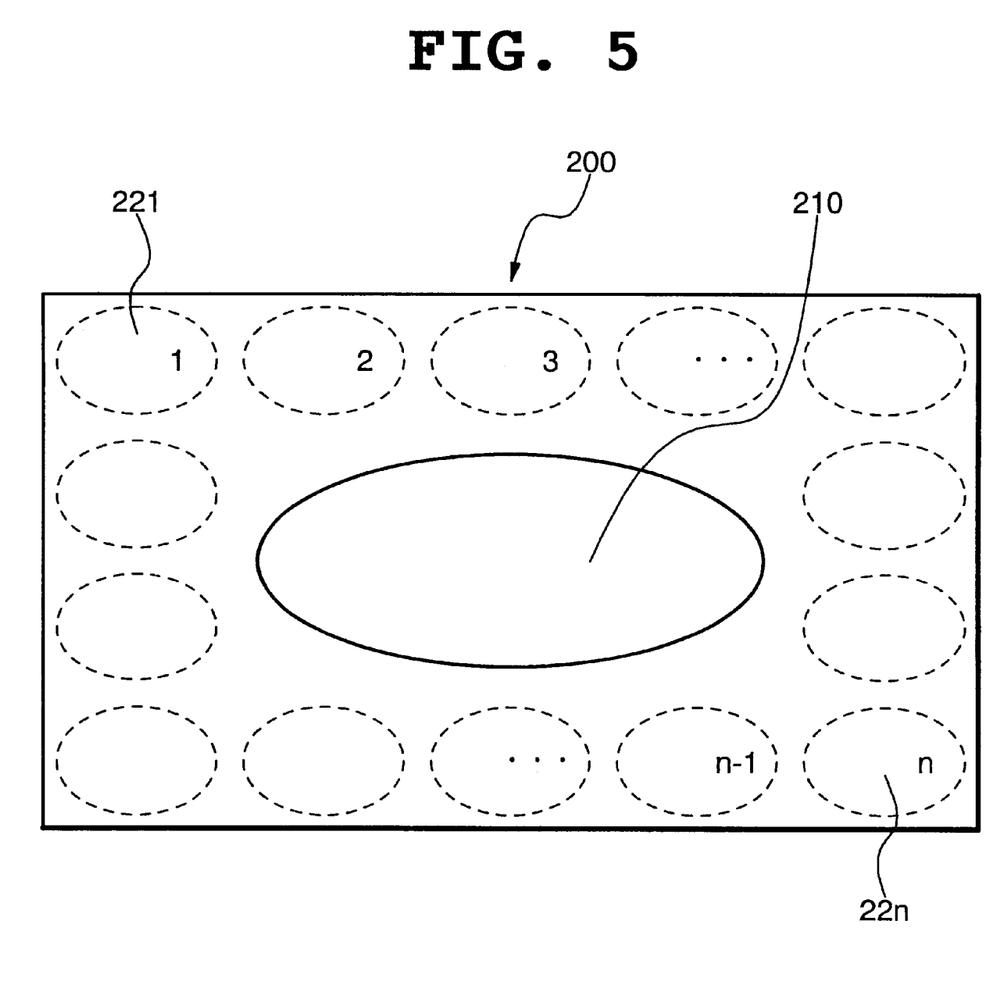
FIG. 5 is a diagram showing another example of a pattern of a region from which a picture signal is extracted out of a picture frame.

Position, size, configuration of the target picture region 210, the number of divisions, position of divisions, size and configuration of divisional background regions in the picture frame 200 shown in FIG. 2 can be arbitrarily set to be those efficient in improving the quality of a target picture accommodated in an extracted region. For example, the example illustrated in FIG. 5 shows a case where the target picture region 210 and the divisional background regions 221–22n are set to be elliptical.

In addition, as to which divisional background region is to be extracted in each frame and as to how many divisional background regions are to be extracted can be arbitrarily determined according to a kind and a state of picture and performance of a picture data transmission device. Although shown in the present embodiment is a case where divisional background regions are extracted one by one, two or more divisional background regions each, for example, can be extracted.

A terminal device which receives picture data transmitted from the picture data transmission device 10 of the present embodiment requires no special structure for receiving and decoding the picture data in question. This is because although a coded signal transmitted from the picture data transmission device 10 is not being refreshed excluding a part of the picture, the signal completely includes a picture signal of one frame, whereby the terminal device which receives the coded signal in question only needs to decode the signal as picture data of one frame without distinguishing parts of the picture.

Moreover, the region extraction processing circuit 12 and the picture coding circuit 13 can be implemented by program-controlled CPU and RAM or other internal memory as described above. In this case, a picture signal coding program for controlling the CPU is presented being stored in a magnetic disc, an optical disc, a semiconductor memory or other common storage medium. The picture signal coding program in question is loaded into the internal memory to control the CPU, thereby realizing the above-described functions of the region extraction processing circuit 12 and the picture coding circuit 13.

As described in the foregoing, by coding a picture signal exclusively with respect to a picture of a target picture region and a picture of a part of a background region in each frame, the present invention is allowed to reduce the amount of coded data generated. At the same time, since as to the target picture region, it is refreshed in each frame, the target picture will not become unclear. Moreover, since also as to the background region, picture can be transmitted and a plurality of divisional parts are refreshed once every several frames, much more information can be transmitted as compared with a case where transmission of a picture is completely limited.

As described above, the present invention has an advantage of conducting extremely practical picture data transmission while reducing the amount of coded data generated.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A picture data transmission device for use in the transmission of a picture in a television system, comprising:

picture input means for receiving input of a picture signal;

region extraction processing means for extracting, from a picture signal applied through said picture input means, a picture signal of a predetermined region in a picture frame of the picture in question;

picture coding means for coding and outputting a picture signal of a region extracted by said region extraction processing means; and interface means for transmitting a coded signal obtained by coding by said picture coding means to a terminal device of other conference participant by means of predetermined transmission means; wherein said region extraction processing means
out of a picture frame, extracts a picture signal of a target picture region containing a target picture and a picture signal of a part of a background region which is other region than the target picture region in question and transfers the signals to said picture coding means, and
selects a part of said background region to be extracted from said picture signal such that the part varies with each picture frame.

2. The picture data transmission device as set forth in claim 1, wherein
with respect to each picture frame, said region extraction processing means sequentially selects an arbitrary number of divisional background regions which are obtained by dividing said background region into a plurality of small regions to extract a picture signal.

3. The picture data transmission device as set forth in claim 1, wherein
said picture coding means outputs a coded signal obtained by coding a picture signal extracted by said region extraction processing means, as well as continuously outputting a coded signal output immediately before with respect to a region in said picture frame not included in the picture signal extracted by said region extraction processing means.

4. The picture data transmission device as set forth in claim 1, wherein
with respect to each picture frame, said region extraction processing means sequentially selects an arbitrary number of divisional background regions which are obtained by dividing said background region into a plurality of small regions to extract a picture signal, and
said picture coding means outputs a coded signal obtained by coding a picture signal extracted by said region extraction processing means, as well as continuously outputting a coded signal output immediately before with respect to a region in said picture frame not included in the picture signal extracted by said region extraction processing means.

5. A picture signal coding method in a television system, comprising the steps of:
from an applied picture signal, extracting a picture signal of a predetermined region in a picture frame of the picture in question; and
coding and outputting a picture signal of a region extracted by said region extraction step; wherein
at said region extraction step
out of a picture frame, a picture signal of a target picture region containing a target picture and a picture signal of a part of a background region which is other region than the target picture region in question are extracted and transferred to said picture coding means, and
a part of said background region to be extracted from said picture signal is selected such that the part varies with each picture frame.

6. The picture signal coding method as set forth in claim 5, wherein
at said region extraction step, with respect to each picture frame, an arbitrary number of divisional background regions which are obtained by dividing said background region into a plurality of small regions are sequentially selected to extract a picture signal.

7. The picture signal coding method as set forth in claim 5, wherein
at said coded signal outputting step, a coded signal obtained by coding a picture signal extracted at said region extraction step is output, while a coded signal output immediately before is continuously output with respect to a region in said picture frame not included in the picture signal extracted at said region extraction step.

8. The picture signal coding method as set forth in claim 5, wherein
at said region extraction step, an arbitrary number of divisional background regions which are obtained by dividing said background region into a plurality of small regions are sequentially selected with respect to each picture frame to extract a picture signal, and
at said coded signal outputting step, a coded signal obtained by coding a picture signal extracted at said region extraction step is output, while a coded signal output immediately before is continuously output with respect to a region in said picture frame not included in the picture signal extracted at said region extraction step.

9. A computer readable memory storing a picture signal coding program for controlling a picture data transmission device for use in the transmission of a picture in a television system to code a picture signal,
said picture signal coding program comprising the steps of:
from an applied picture signal, extracting a picture signal of a predetermined region in a picture frame of the picture in question; and
coding and outputting a picture signal of a region extracted at said region extraction step; wherein
at said region extraction step
out of a picture frame, a picture signal of a target picture region containing a target picture and a picture signal of a part of a background region which is other region than the target picture region in question are extracted and transferred to said picture coding means, and
a part of said background region to be extracted from said picture signal is selected such that the part varies with each picture frame.

10. The computer readable memory as set forth in claim 9, wherein
said picture signal coding program,
at said region extraction step, sequentially selects, with respect to each picture frame, an arbitrary number of divisional background regions which are obtained by dividing said background region into a plurality of small regions to extract a picture signal.

11. The computer readable memory as set forth in claim 9, wherein
said picture signal coding program,
at said coded signal outputting step, outputs a coded signal obtained by coding a picture signal extracted at said region extraction step, as well as continuously outputting a coded signal output immediately before with respect to a region in said picture frame not included in the picture signal extracted at said region extraction step.

12. The computer readable memory as set forth in claim 9, wherein
said picture signal coding program,
at said region extraction step, with respect to each picture frame, sequentially selects an arbitrary number of divisional background regions which are obtained by dividing said background region into a plurality of small regions to extract a picture signal, and at said coded signal outputting step, outputs a coded signal obtained by coding a picture signal extracted at said region extraction step, as well as continuously outputting a coded signal output immediately before with respect to a region in said picture frame not included in the picture signal extracted at said region extraction step.

13. A picture data transmission device for use in the transmission of a picture in a television system, comprising:

a picture input circuit which receives input of a picture signal, a region extraction processing circuit which extracts, from a picture signal applied through said picture input circuit, a picture signal of a predetermined region in a picture frame of the picture in question, a picture coding circuit which codes and outputs a picture signal of a region extracted by said region extraction processing circuit, and an interface circuit which transmits a coded signal obtained by coding by said picture coding circuit to a terminal device of other conference participant by means of a predetermined transmission circuit, wherein said region extraction processing circuit out of a picture frame, extracts a picture signal of a target picture region containing a target picture and a picture signal of a part of a background region which is other region than the target picture region in question and transfers the signals to said picture coding circuit, and selects a part of said background region to be extracted from said picture signal such that the part varies with each picture frame.

14. The picture data transmission device as set forth in claim 13, wherein with respect to each picture frame, said region extraction processing circuit sequentially selects an arbitrary number of divisional background regions which are obtained by dividing said background region into a plurality of small regions to extract a picture signal.

15. The picture data transmission device as set forth in claim 13, wherein said picture coding circuit outputs a coded signal obtained by coding a picture signal extracted by said region extraction processing circuit, as well as continuously outputting a coded signal output immediately before with respect to a region in said picture frame not included in the picture signal extracted by said region extraction processing circuit.

16. The picture data transmission device as set forth in claim 13, wherein with respect to each picture frame, said region extraction processing circuit sequentially selects an arbitrary number of divisional background regions which are obtained by dividing said background region into a plurality of small regions to extract a picture signal, and said picture coding circuit outputs a coded signal obtained by coding a picture signal extracted by said region extraction processing circuit, as well as continuously outputting a coded signal output immediately before with respect to a region in said picture frame not included in the picture signal extracted by said region extraction processing circuit.

* * * * *